United States Patent

[11] 3,542,350

[72] Inventor William Lyon Sherwood
  2678 Marine Drive, West Vancouver,
  British Columbia, Canada
[21] Appl. No. 681,032
[22] Filed Nov. 6, 1967
  Continuation of Ser. No. 369,523,
  May 22, 1964, abandoned.
[45] Patented Nov. 24, 1970

[54] APPARATUS FOR CONTINUOUS METAL MELTING AND REFINING
  9 Claims, 1 Drawing Fig.
[52] U.S. Cl. .................................................... 266/11,
  266/33, 266/18, 266/36; 75/43, 75/65, 75/38
[51] Int. Cl. ....................................................... C21b 11/06,
  C21b 13/08, C22b 7/00
[50] Field of Search .......................................... 266/11, 33,
  18, 36R; 75/40, 43, 65, 38, 39, 28, 11

[56] References Cited
  UNITED STATES PATENTS

| | | | |
|---|---|---|---|
| 1,415,183 | 5/1922 | Lund............................ | 266/11 |
| 1,819,239 | 8/1931 | Greene........................ | 75/11 |
| 3,060,014 | 10/1962 | Aihara.......................... | 75/43 |
| 3,169,055 | 2/1965 | Josefsson et al. ............. | 75/40 |
| 3,194,650 | 7/1965 | Kurzinski ..................... | 75/43 |
| 3,353,810 | 11/1967 | Sherwood..................... | 266/37 |

Primary Examiner—Henry W. Tarring, II

ABSTRACT: Liquid nonferrous metals of controlled temperatures and composition, such as copper and aluminum alloys, are produced continuously by introducing pieces of metal, along with fluxes and alloys as required into an elongated rotary furnace. The charge is melted by means of heat from a burner directed through the furnace charge opening to form a metal bath and a layer of slag floating on it, and the metal formed is continuously refined by means of slag-metal interaction under the agitating and advancing action of the rotary furnace walls, with controlled heat for refining being supplied by a second burner directed through the rotary furnace discharge opening.

Patented Nov. 24, 1970
3,542,350
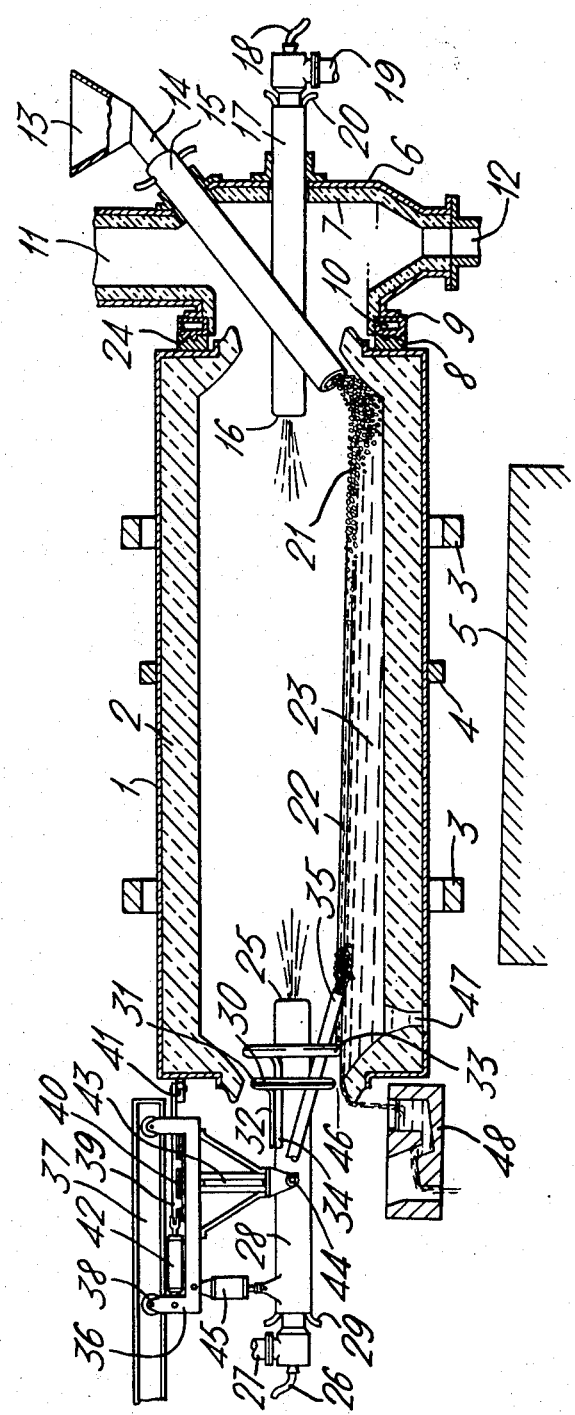
Inventor:
William Lyon Sherwood.

3,542,350

APPARATUS FOR CONTINUOUS METAL MELTING AND REFINING

This application is a continuation of application Ser. No. 369,523, filed on May 22, 1964, and now abandoned.

The invention is an apparatus for melting and refining solid metallic pellets to obtain liquid metals of controlled composition suitable for casting.

In extractive metallurgy, there are a number of reduction processes which yield a solid metallic product consisting of pieces within a predictable and substantially uniform size range and chemical composition. Such products, however, often do not yet have the desired size, shape and chemical analysis desired for the finished metal product. In ferrous metallurgy, for example, several so-called direct reduction processes are known for solid-state reduction of pelletized iron ore concentrate to yield metallic sponge iron pellets. In order to convert these metallic pellets to cast steel ingots, billets or slabs, it is only necessary to melt the pellets, separating any gangue constituents contained therein into a liquid slag phase, adjusting the chemical composition of the metal by controlled additions of alloying and fluxing materials, and heating the metal to casting temperature for introduction into a suitable casting apparatus, thereby obtaining steel of the size, shape and grade required in use.

A number of known processes and apparatus combinations exist which may be used for the melting and refining of metallic pellets to yield a product for casting into usable form. Mainly, however, these processes were designed and are used for processing materials having irregular size and composition; for example, in ferrous metallurgy, the electric arc, open hearth, oxygen converter and cupola furnaces used for processing iron and steel scrap.

It is the principal object of this invention to provide a new method and apparatus for melting and refining metals, particularly suitable for processing of regularly-sized solid metallic pellets having consistent and known compositions.

Another object of the present invention is to provide for continually charging, advancing and discharging the materials in process, thereby achieving continuous operation, a particularly advantageous feature when employed in combination with a preceding continuous reduction operation, and a succeeding continuous casting operation.

Another object of the present invention is to facilitate a nearly complete combustion of furnace gases, thereby minimizing loss in the exhaust gas of heating values in unburned fuel, for example, unburned carbon monoxide contained in the exhaust gas.

A further object is to provide a melting and refining technique capable of utilizing a wide variety of fuels in the form of liquids, gases or powdered coal.

Still another object is to provide, by the agitating action of the rotating process equipment, a metallic and intimate contact of metal and slag, with associated rapid heat transfer and rapid rate of chemical reactions.

According to the invention, there is provided a method and apparatus involving the charging of solid metallic pellets, generally along with controlled quantities of fluxes and alloys, into a rotary furnace heated by a burner at either end. The pellets are continually advanced along a melting zone within the rotary furnace and at the same time heated until fusion and separation into metal and slag phases occur. The liquid metal and slag obtained from melting are advanced into a refining zone within the rotary furnace, further heated and advanced along the refining zone until the desired temperature and composition is obtained, then discharged and separated into slag and metal components prior to casting of the metal.

The apparatus may be employed in conjunction with a solid-state ore reduction operation, the reduced metallic pellets obtained as a product from the reduction operation comprising the metallic feed pellets into the rotary furnace employed in the method of this invention.

The metallic feel pellets are preferably within a restricted size range within the limits 3 to 25 millimeters, thereby combining the desirable characteristics of free flow and easy handling with resistance to agglomeration and excessive oxidation at high temperature. In ferrous metallurgy, there are processes which produce by direct reduction in the solid state, metallic pellets mainly within the size range from 5 to 15 millimeters suitable as feed for the new method of this invention.

The feel pellets should also have a substantially uniform and known composition over considerable periods, thereby facilitating control of the product composition.

Hot gases preferably flow in contact with the charge mixture and countercurrent to the general movement of charge mixture, in sequence, through the refining zone and the melting zone, and are expelled from the charge end of the rotary furnace.

Other features which may be included within the scope of the invention will be hereinafter described and are referred to in the appended claims.

The practice of the method and apparatus of this invention will now be described in detail with reference to the drawing, FIG. 1, which shows diagrammatically, in elevation and partly in section, a suitable apparatus for conducting the process.

In using the new apparatus in conjunction with a reduction operation, the metallic pellets may be introduced directly into the melting zone, without cooling, directly from the reduction process. In this event, some protective atmosphere to prevent reoxidation of metallic values may be necessary during the time of transfer between discharge from reduction and charging into the melting zone. Alternatively, the pellets may be cooled after reduction, stored if desired, and subsequently fed into the melting zone.

Referring to FIG. 1, the rotary furnace comprises a body consisting of a cylindrical steel shell 1 lined with refractory material 2. The furnace is supported for rotation relative to foundation supports 5, on rollers 3, which rest on conventional trunnions (not shown) mounted on the foundation supports 5 in known manner.

The shell is rotatable by a motor and train of speed-reducing gears (not shown), the last gear of which meshes with bull gear 4 secured around the reactor shell. Various speeds of rotation, up to 50 r.p.m. may be employed.

The shell may be mounted horizontally, but is generally slightly inclined, at an angle from 1° to 10° to the horizontal, downwardly from the charge end towards the discharge end.

The metal, fluxes and alloys are introduced into feed hopper 13, and flow by gravity through inclined feed pipe 14, cooled by water jacket 15, into the mixture of partially melted charge material 21 within the melting zone of the rotary furnace.

The furnace head 6, provided with refractory lining 7 to protect the steel shell and to prevent excessive heat loss, functions as a support for feed pipe 14, and charge end burner 16 and also acts as a conduit for removal of exhaust gases. The furnace head 6 is maintained in a fixed relation to the furnace in known manner, by means of contact between the interlocking grooved, lubricated sealing surfaces 24 of stationary annular head positioning ring 9, attached to furnace head 6, and rotating head positioning ring 8 attached to furnace shell 1. Uniform contact pressure around the circumference of these surfaces is maintained by biasing apparatus (not shown) such as an assembly of cables and counterweights The sealing surfaces may be cooled by water jacket 10.

Heat for melting is supplied by means of charge end burner 16. Fuel and air or oxygen, which may be preheated, are supplied by way of burner fuel inlet 18 and burner air inlet 19. The burner water jacket 17 is supplied with cooling water by means of water inlet and outlet pipes 20. Exhaust gas expelled from the furnace is withdrawn by way of exhaust gas duct 11, the coarse dust particles dropping into dust collector duct 12.

Within the furnace, the liquid metal 23 and liquid slag 22 are continually agitated and advanced from the charge end to the discharge end of the furnace by the rotary wall movement. A second burner 25, also provided with a fuel inlet 26, air inlet 27 and water jacket 28 supplied by water inlet and outlet pipes 29, is directed into the furnace through the annular discharge opening 46.

In the rotary furnace being described which may discharge liquid by overflowing through a restricted opening, it will be appreciated that the slag will tend to move more quickly through the furnace than the metal. To control the slag discharge rate, the adjustably-positioned slag barrier 33 is provided. This barrier 33 is attached to burner 25 and may consist of a refractory material, or a water cooled shell of heat-resisting material, supplied with water by water inlet and outlet pipes 34.

In order to prevent the free transfer of gases through the discharge opening 46 of the furnace, a sealing curtain of high-velocity gas may be employed. The curtain is emitted from the annular slit 31 in header pipe 30, which is supplied with the sealing gas under pressure by way of supply pipe 32. The curtain gas impinges upon the inner surface of discharge opening 46, thereby substantially preventing axial flow of gases through the opening despite static pressure differences between the atmosphere and furnace interior.

To accomplish the adjustment movement of the burner assembly, the discharge end burner 25 is mounted at the lower end of burner support brackets 43 suspended from carriage 36 having wheels 38 running on tracks 37. Adjustment of the burner position in the axial direction relative to the discharge opening 46 of the furnace is effected by adjusting the distance between a roller 41 and the carriage 36 by movement of bearing shoes 39 sliding on a tract 40, under the action of a horizontally arranged hydraulic ram 42 mounted on the carriage 36. Contact between roller 41 and the end wall of the furnace may be maintained by means of biasing apparatus (not shown) such as counterweights attached by cable to the carriage assembly through pulleys.

Adjustment of the burner and slag barrier position in the vertical direction relative to the discharge opening 46 is effected by pivotally mounting the burner 25 on horizontally disposed pivot bearings 44. The burner 25 is pivoted about the bearings 44 by a vertically arranged hydraulic ram 45 connected between the rear end of the burner 25 and the carriage 36. This arrangement provides easy removal of the burner from the furnace for repair or to provide access to the reactor interior through the discharge opening 46.

Heat may be applied to the inner walls of the discharge opening 46, if necessary to prevent any tendency of slag or metal to solidify and adhere to the refractory, by arranging burners (not shown) in a manner to direct the hot products of combustion to impinge on the inner surface of the discharge opening. The method is employed most effectively when the burners are positioned to apply heat to a segment of the discharge opening 46 adjacent to the discharging metal stream, so as to heat the surface of the refractory just prior to its contact with the liquid metal. Alternatively, the surface of the discharge opening may be heated by electric resistance elements embedded in the refractory. Tungsten, molybdenum or silicon carbide are examples of materials suitable for the elements and high-purity magnesia or alumina for the refractory lip material which encases the elements. Electrical energy can be supplied to the elements in known manner by means of stationary brushes in contact with collector rings attached to, and rotating with, the reactor shell.

Alloys and fluxes, such as carbon, aluminum, calcium carbide and ferrosilicon may be infected in finely-divided form through the discharge opening 46, for control of the finished metal composition. One or more injection lances, of known manner of construction and usually water-cooled, may be provided for this purpose, and is indicated by the solids injection pipe 35 in the embodiment shown. The material to be injected is entrained and injected under pressure using known means through the injection pipe 35 which can be directed either to discharge onto the slag, or downwards through the slag into the bath. Additions by injection may also be made to the liquid metal after discharge and prior to casting.

The liquid metal and slag may be discharged together by overflowing through the discharge opening 46 and be separated after discharge by a slag separation device 48, which may be heated and of which there are a number of known variations. Alternatively, the metal may be syphoned from the furnace by way of a refractory tube inserted into the furnace through the discharge opening 46 and down into the metal bath. In this event, it may be desirable to discharge the slag intermittently, rather than continuously. The metal would be discharged by suction into a closed vessel under controlled negative pressure, or syphoned into a receptacle containing metal at a level lower than the level of liquid metal 23 within the furnace.

I claim:
1. Apparatus for continuous metal melting and refining comprising, in combination:
   a. an elongated rotary furnace sufficiently long to provide substantially separate melting and refining zones;
   b. charge means adapted for introducing solid charge materials through an axial opening at the charge end of the rotary furnace into the melting zone;
   c. a burner directed into the melting zone at the charge end;
   d. furnace rotating means for continually agitating and advancing charge mixture progressively along the length of the furnace from the charge end through the melting zone and the refining zone to the discharge end;
   e. exhausting means for effecting a general flow of hot gases within the furnace from the discharge end to the charge end and expelling the gases through said axial opening at the charge end;
   f. a second burner directed into the refining zone at the discharge end; and
   g. discharge means for removing liquid metal and slag from the furnace at the discharge end.

2. The apparatus of claim 1 which also includes charge means adapted for continuously introducing solid charge materials into the furnace by way of the discharge end opening.

3. Apparatus for continuous metal melting and refining comprising, in combination:
   a. an elongated rotary furnace sufficiently long to provide substantially separate melting and refining zones;
   b. charge means adapted for introducing solid charge materials through an axial opening at the charge end of the rotary furnace into the melting zone;
   c. a burner directed into the melting zone at the charge end;
   d. furnace rotating means for continually agitating and advancing charge mixture progressively along the length of the furnace from the charge end through the melting zone and the refining zone to the discharge end;
   e. exhausting means for effecting a general flow of hot gases within the furnace from the discharge end to the charge end and expelling the gases through said axial opening at the charge end;
   f. a second burner directed into the refining zone at the discharge end; and
   g. discharge means adapted for substantially continuously removing liquid metal and slag from the furnace through a restricted axial discharge opening at the discharge end.

4. An apparatus according to claim 3 in which the metal and slag are discharged by overflowing through said restricted axial discharge opening, the periphery of said opening confining a pool of charge having a substantially constant depth within the furnace, said pool extending along the furnace length.

5. An apparatus according to claim 3 in which the metal and slag are discharged by overflowing through said restricted axial discharge opening, the periphery of said opening confining a pool of charge having a substantially constant depth within the furnace, said pool extending along the furnace length, and said charge means are adapted to introduce charge materials substantially continuously and the rate of metal discharge is thereby governed according to the rate of displacement by new charge materials introduced into said pool.

6. Apparatus for continuous metal melting and refining comprising, in combination:

a. an elongated rotary furnace sufficiently long to provide substantially separate melting and refining zones;
b. charge means adapted for introducing solid charge materials through an axial opening at the charge end of the rotary furnace into the melting zone;
c. a burner directed into the melting zone at the charge end;
d. furnace rotating means for continually agitating and advancing charge mixture progressively along the length of the furnace from the charge end through the melting zone and the refining zone to the discharge end;
e. exhausting means for effecting a general flow of hot gases within the furnace from the discharge end to the charge end and expelling the gases through said axial opening at the charge end;
f. a second burner directed into the refining zone at the discharge end which is adjustably positioned within an axial opening at the discharge end; and
g. discharge means for removing liquid metal and slag from the furnace at the discharge end.

7. The apparatus of claim 6 which also includes sealing means of the axial discharge end opening.

8. The apparatus of claim 6 which also includes sealing means of the discharge end opening comprising a hollow annular tube mounted circumferentially on the discharge end burner and having at least one longitudinal slit therein for emission under pressure of a gas curtain to impinge upon the inner surface of said discharge end opening.

9. The apparatus of claim 6 which also includes a slag dam attached to the discharge end burner and projecting downwardly therefrom adapted to effect controlled restriction of said axial discharge end opening for adjusting the rate of discharge of slag.